United States Patent Office 3,647,681
Patented Mar. 7, 1972

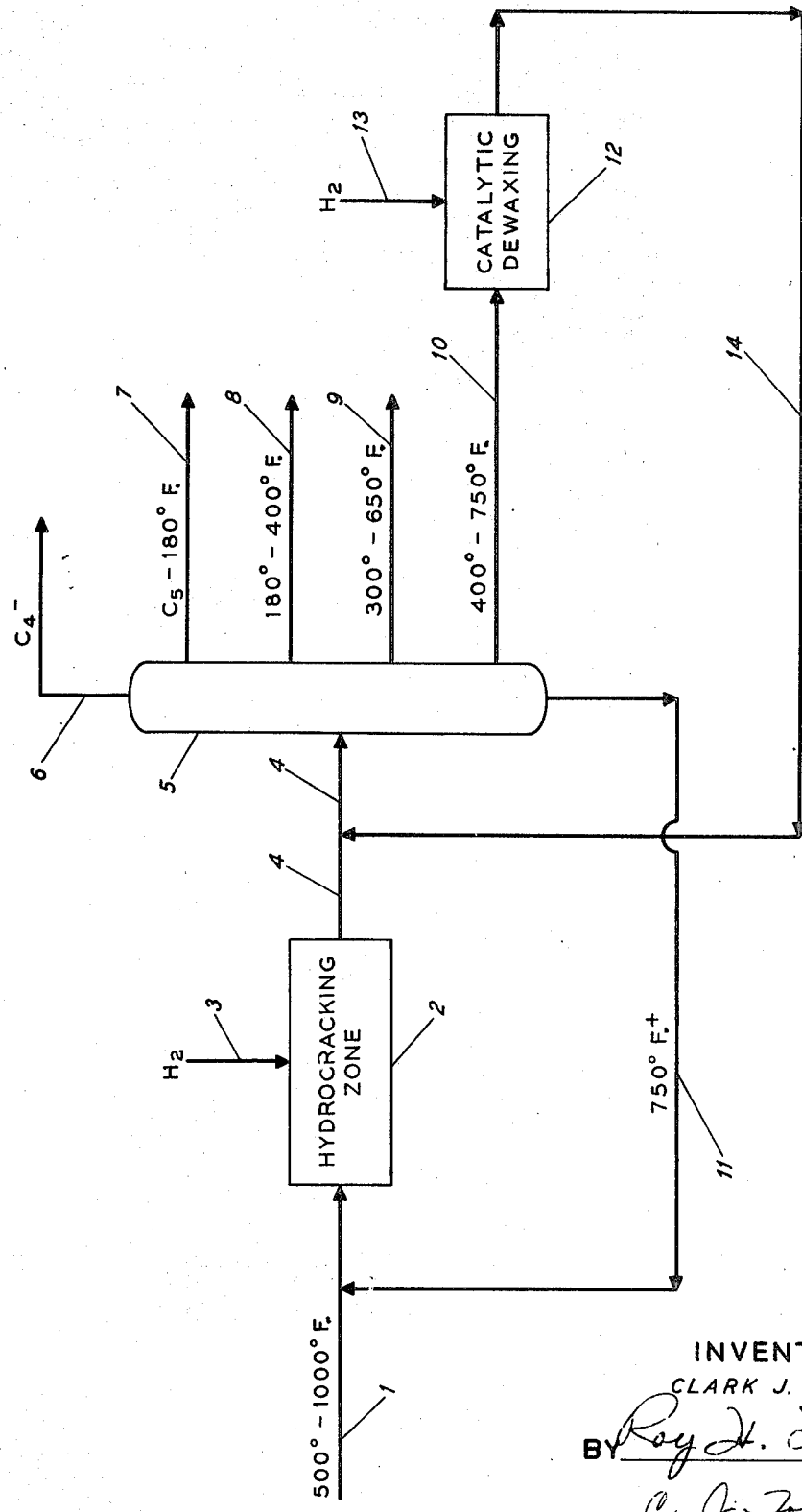

3,647,681
CATALYTIC DEWAXING
Clark J. Egan, Piedmont, Calif., assignor to Chevron Research Company, San Francisco, Calif.
Filed Sept. 9, 1969, Ser. No. 856,401
Int. Cl. B01j *11/40;* C10g *13/02, 23/00*
U.S. Cl. 208—111
14 Claims

ABSTRACT OF THE DISCLOSURE

The normal paraffin content of a hydrocarbon oil is reduced by contacting said hydrocarbon oil at catalytic dewaxing conditions with hydrogen and a catalyst comprising mordenite in hydrogen form, at least one hydrogenating component, and carbon in an amount of at least one-half weight percent.

---

This invention relates to catalytic dewaxing of hydrocarbon oils, and more particularly to catalytically dewaxing waxy hydrocarbon oils with an improved catalyst comprising mordenite and at least one hydrogenating component.

PRIOR ART

Catalytic dewaxing of hydrocarbon oils is well known in the art and refers to the reduction of the normal paraffin content of the oils by catalytic conversion of normal paraffins rather than by mere physical removal of normal paraffins without conversion thereof.

Copending Egan U.S. patent application Ser. No. 771,880 (now U.S. Patent 3,539,495) adequately discusses the reasons for catalytic dewaxing of hydrocarbon oils, including reasons why continuing efforts are being made in the petroleum industry to find improved dewaxing catalysts and processes.

A recent development in the area of catalytic dewaxing is provided by accomplishing catalytic dewaxing with a catalyst comprising a crystalline aluminosilicate zeolite in hydrogen form having uniform pore openings with a minor pore diameter as determined by crystallography of not less than 5.8 and a major pore diameter less than 8 angstroms at a temperature of at least 450° F., as disclosed in Texaco Development Corporation South Africa patent 67/3685 (equivalent to U.S. Pat. 3,539,498, issued Nov. 10, 1970). The zeolite having the required characteristics is a mordenite-type zeolite. It is highly preferable that the mordenite be in hydrogen form; the sodium form, for example, produces inferior dewaxing results. A catalytic material, suitably a Group VIII metal, preferably a platinum group metal, preferably is associated with the zeolite. The decationized mordenite-type zeolite structures have pore sizes sufficiently large to admit not only the straight-chain hydrocarbons which it is desired to selectively convert to lower molecular weight materials, but also cyclic hydrocarbons; in contrast, the straight-chain hydrocarbons alone are selectively admitted to 5-angstrom molecular sieves, the pores of which quickly become saturated with waxy components, causing catalyst deactivation. Accordingly, the decationized mordenite zeolite structures have a greater capacity for sustained selective conversion of straight-chain components than do 5-angstrom molecular sieves. The mordenite-type zeolite has a chain-type zeolite structure in which a number of chains are linked together into a structural pattern with parallel sorption channels similar to a bundle of parallel tubes, in contrast with the three-dimensional structural lattices which are characteristic of molecular sieve zeolites such as Y-type faujasites. The mordenite-type zeolite dewaxing catalyst preferably comprises a Group VIII hydrogenating component, particularly nickel, platinum, palladium and rhodium, in an amount of 0.1 to 10 weight percent, calculated as metal. When the hydrogenating component is platinum or palladium, the recommended amount is 0.1 to 5.0 weight percent, preferably 0.5 to 2.5 weight percent. When the hydrogenating component is nickel, cobalt or iron, the recommended amount is 1 to 10 weight percent, preferably 1 to 5 weight percent. Hydrogen, in conjunction with the hydrogenating component of the catalyst, extends the life of the catalyst during catalytic dewaxing by preventing fouling of the pore openings of the catalyst. The catalyst may be preconditioned in hydrogen before use, at a temperature in the range 450° to 1000° F.

A mordenite-type zeolite in hydrogen form that is suitable for purposes of the process of said South African patent 67/3685 and for purposes of the present invention is the calcined synthetic "Zeolon H" mordenite sold commercially by the Norton Company.

As used hereinafter, the terms "mordenite," "hydrogen mordenite," and "mordenite in hydrogen form" are intended to include these mordenite-type zeolites indicated by said South Africa patent 67/3685 to be desirable as catalytic dewaxing catalysts or as components of catalytic dewaxing catalysts.

OBJECTS

In view of the catalyst dewaxing advances disclosed in said South African patent 67/3685 and the continuing need for further catalytic dewaxing advances, it would be desirable if the dewaxing catalyst and process of that patent could be even further improved. It is an object of the present invention to provide such improvements, as well as other improvements in catalytic dewaxing.

DRAWING

The above and additional objects of the present invention, and the ways in which these objects are achieved, will better be understood from the following description when read in connection with the accompanying drawing, which is a diagrammatic illustration of apparatus and flow paths suitable for carrying out certain embodiments of the invention.

STATEMENT OF INVENTION

In accordance with the present invention it has been found that a catalytic dewaxing catalyst comprising mordenite in hydrogen form and at least one hydrogenating component will produce improved catalytic dewaxing results if it contains at lest one-half weight percent, and up to 10 weight percent, preferably 1–5 weight percent, based on the total catalyst, of carbon, Suitably the carbon may be coke deposited during a previous pretreating operation in which a hydrocarbon feedstock was contacted with hydrogen and the catalyst comprising mordenite, at elevated temperatures and pressures for a time sufficient to permit the required amount of carbon deposition. More particularly, in accordance with the present invention there is provided:

(1) A hydrocarbon conversion catalyst comprising mordenite, at least one hyrogenating component, and carbon in an amount of at least one-half weight percent, based on the total catalyst. Preferably the mordenite is in the hydrogen form. Desirably said hydrogenating component is a Group VIII metal or compound thereof, preferably selected from the metals platinum, palladium, iridium, ruthenium, rhodium and nickel and compounds of said metals. In one embodiment, said catalyst further comprises a component selected from rhenium and compounds of rhenium.

(2) The method of improving the catalytic dewaxing properties of a catalyst comprising mordenite and at least one hydrogenating component, which comprises contacting said catalyst with hydrogen and a hydrocarbon distillate boiling in the range 500° to 1100° F., at a temperature in the range 400° to 900° F., a pressure in the range 500 to 3500 p.s.i.g., and a liquid hourly space velocity in the range 0.1 to 10, at a total hydrogen rate in the range 200 to 20,000 s.c.f. of hydrogen per barrel of said distillate, until said catalyst contains at least one-half weight percent carbon, based on the total catalyst.

(3) A catalytic dewaxing process which comprises contacting in a reaction zone a hydrocarbon feedstock containing normal paraffins with hydrogen and a catalyst comprising mordenite in hydrogen form, at least one hydrogenating component, and carbon in an amount of at least one-half weight percent based on the total catalyst, at a temperature of 400° to 900° F., a pressure of 100 to 2000 p.s.i.g., a liquid hourly space velocity of 0.2 to 25 volumes of said feedstock per volume of catalyst per hour, and a total hydrogen rate of 200 to 20,000 s.c.f. of hydrogen per barrel of said feedstock, and recovering from said reaction zone a liquid product containing in the feed boiling range portion thereof a smaller percentage of normal paraffins than is contained in said feedstock. Desirably said temperature is 500° to 850° F., said pressure is 500 to 1500 p.s.i.g., said liquid hourly space velocity is 2 to 10 volumes of said feedstock per volume of catalyst per hour, and said total hydrogen rate is 1000 to 10,000 s.c.f. of hydrogen per barrel of said feedstock. In a preferred embodiment, said hydrocarbon feedstock contains less than 15 weight percent, preferably less than 10 weight percent, normal paraffins, for purposes of maximizing yield of dewaxed liquid product. Desirably said feedstock contains less than 50 p.p.m., preferably less than 10 p.p.m., organic nitrogen and less than 100 p.p.m., organic sulfur; despite certain language tending to teach to the contrary in said South Africa patent 67/3685, better results are obtained if the nitrogen and sulfur contents of the feedstock are kept within the above limits. Desirably said feedstock boils in the range 400° to 900° F., preferably 400° to 750° F., and more preferably 450° to 650° F.

Further in accordance with the present invention there is provided an integrated hydrocracking-dewaxing process for producing low freeze point jet fuels. More particularly, there is provided a process for producing a jet fuel which comprises hydrocracking a hydrocarbon feedstock boiling in the range 500° to 1000° F. by contacting said feedstock in a reaction zone with hydrogen and a hydrocracking catalyst at hydrocracking conditions, withdrawing from said reaction zone a first fraction boiling in the range 300° to 650° F. and a second fraction boiling in the range 400° to 750° F. and having a higher freeze point than said first fraction, catalytically dewaxing said second fraction in the presence of hydrogen and a catalyst comprising mordenite in hydrogen form, at least one hydrogenating component and carbon in an amount of at least one-half weight percent, based on the total catalyst, to produce a dewaxed product, and combining said first fraction with at least a portion of said dewaxed product boiling in the range 300° to 650° F. to produce a high-quality jet fuel. The hydrocracking is carried out in said reaction zone with a conventional hydrocracking catalyst, for example nickel sulfide on silica-alumina or palladium on a crystalline zeolitic molecular sieve, at conventional hydrocracking conditions. Said conditions may include a temperature in the range 450° to 850° F., a pressure in the range 1000 to 3500 p.s.i.g., a liquid hourly space velocity in the range 0.1 to 3.0, and a total hydrogen supply rate of 200 to 20,000 s.c.f. of hydrogen per barrel of said feedstock.

DISCUSSION OF DRAWING

Referring now to the drawing, there shown is a diagrammatic illustration of apparatus and flow paths suitable for carrying out the process of one embodiment of the present invention.

A hydrocarbon distillate feedstock boiling in the range 500° to 1000° F. is supplied through line 1 to hydrocarcking zone 2, which is supplied with hydrogen through line 3. Said feedstock is hydrocracked in zone 2 at conditions previously described. The effluent from zone 2 is passed through line 4 to separation zone 5, which may be a distillation zone, and is there separated into fractions, including:

(1) A $C_4^-$ gas fraction which is withdrawn through line 6.

(2) A $C_5^-$ 180° F. light gasoline fraction which is withdrawn through line 7.

(3) A 180°–400° F. heavy gasoline fraction which is withdrawn through line 8, and which may be reformed if desired.

(4) A fraction boiling in the range 300°–650° F., suitable for use as a jet fuel or jet fuel blend stock, either before or after further treatment, for example hydrogenation, which is withdrawn through line 9.

(5) A fraction boiling in the range 400° to 750° F., which has a higher freeze point than the fraction in line 9, which is passed through line 10 to catalytic dewaxing zone 12.

(6) A 750° F.+ fraction, which is recycled to zone 2 through line 11.

The fraction entering zone 12 through line 10 is catalytically dewaxed in zone 12 in the presence of hydrogen entering zone 12 through line 13 and in the presence of the carbon-containing catalyst of the present invention, at catalytic dewaxing conditions previously discussed. The effluent from zone 12, reduced in normal paraffin content compared with the fraction in line 10, is passed through lines 14 and 4 to zone 5, where it is separated into the indicated fractions.

EXAMPLES

The following examples will serve to further illustrate the process of the present invention.

Example 1

A portion of a catalyst consisting of hydrogen mordenite impregnated with 2 weight percent palladium, based on the total catalyst, was pretreated by contacting alternately a first hydrocarbon oil feedstock and a second hydrocarbon oil feedstock at selected operating conditions with hydrogen and said catalyst, until carbon deposition on said catalyst amounted to 1.4 weight percent of the catalyst. The characteristics of the feedstock and conditions and time of contacting were as follows:

| | First feedstock[1] | Second feedstock[2] |
|---|---|---|
| Liquid hourly space velocity, v./v./hr | 1.0 | 1.0 |
| Pressure, p.s.i.g | 1,000 | 1,000 |
| Temperature, °F | 550 | 800 |
| Hydrogen, s.c.f./bbl | 5,500 | 5,500 |
| Hours on stream | 560 | 100 |

[1] 650°–1,000° F. hydrocrackate, having a gravity of 32.4 °API, an organic nitrogen content below 10 p.p.m., and an organic sulfur content below 10 p.p.m., obtained by hydrocracking a Gulf Coast vacuum gas oil.
[2] 630°–1,025° F. gas oil, having a gravity of 31.6 °API, an organic nitrogen content of 560 p.p.m., and an organic sulfur content of 0.085 weight percent.

At the end of the above-indicated periods of processing, coke had been deposited on the catalyst in an amount of 1.4 weight percent. The coked catalyst portion so produced, and an additional portion of the same catalyst that had not been coked, by such a pretreatment or otherwise, then were used separately to continuously catalytically dewax separate portions of hydrocarbon stock, potentially valuable as a jet fuel, of the following description:

ASTM D–86 distillation:

| | |
|---|---|
| ST/10% | 485/508 |
| 50% | 521 |
| 90%/EP | 542/560 |
| Gravity, ° API | 33.3 |
| Organic sulfur, p.p.m. | <10 |
| Organic nitrogen, p.p.m. | 0.29 |
| Freeze point, ° F. | +7 |
| Pour point, ° F. | −20 |
| Aniline point, ° F. | 157 |
| Paraffins, vol. percent | 24.6 |
| Naphthenes, vol. percent | 67.0 |
| Aromatics, vol. percent | 8.4 |
| Naphthalenes, vol. percent | 0.6 |
| Smoke point, mm. | 19/18 |
| Normal paraffins, wt. percent | 5.2 |
| $C_{14}$ | 0.6 |
| $C_{15}$ | 1.1 |
| $C_{16}$ | 1.9 |
| $C_{17}$ | 1.2 |
| $C_{18}$ | 0.4 |

From the above description it may be seen that the feedstock to be catalytically dewaxed has a freeze point unacceptably high for jet fuel purposes.

The catalytic dewaxing of said separate portions of said feedstock was accomplished at a pressure of 860 p.s.i.g., a total hydrogen rate of 5000 s.c.f. of hydrogen per barrel of feedstock, and at a liquid hourly space velocity of 4 v./v./hr. The operating temperatures were adjusted as necessary to obtain the desired yields or freeze points. The jet fuel weight percent yields, based on the feed prior to said dewaxing, and the freeze points of the jet fuel products, were as follows:

| | Coked catalyst | Uncoked catalyst |
|---|---|---|
| A. Yield of jet fuel with freeze point of −40° F., weight percent | ¹ 92.5 | ² 88.5 |
| B. Freeze point of jet fuel produced at yield of 88.5 weight percent | ³ −95 | ² −40 |
| Weight percent normal paraffins in 300° F. plus product | 0.4 | 2.0 |
| Product distribution, weight percent: | | |
| C₁ | 0.07 | 0.04 |
| C₂ | 0.08 | 0.06 |
| C₃ | 2.3 | 1.0 |
| iC₄ | 2.6 | 2.4 |
| nC₄ | 1.6 | 0.8 |
| iC₅ | 1.2 | 1.8 |
| nC₅ | 1.7 | 0.8 |
| iC₆ | 0.6 | 1.0 |
| nC₆ | 0.9 | 0.5 |
| C₇–300° F. | 0.3 | 3.0 |
| 300° F. plus | ⁴ 88.5 | ⁵ 88.6 |
| Totals | 100.0 | 100.0 |

¹ Obtained at 645° F. In each case, for both the coked and uncoked catalysts, a higher temperature would result in a lower yield and a lower freeze point.
² Obtained at 595° F.
³ Obtained at 662° F.
⁴ Freeze point below −94° F.
⁵ Freeze point −40° F.

Example 2

A portion of a catalyst consisting of hydrogen mordenite impregnated with 2 weight percent palladium, based on the total catalyst, was pretreated by contacting a hydrocarbon oil feedstock at selected operating conditions with hydrogen and said catalyst, until carbon deposition on said catalyst amounted to 2.6 weight percent of the catalyst. The hydrocarbon oil feedstock was a 725°–1000° F. hydrocrackate, having a gravity of 30.5 API, an organic nitrogen content of 1.22 p.p.m., and an organic sulfur content of 0 weight percent, obtained by hydrocracking a Gulf Coast vacuum gas oil. The pretreating was accomplished at temperatures in the range 650°–750° F., a pressure of 1000 p.s.i.g., a liquid hourly space velocity of 1.0 and a total hydrogen rate of 5500 s.c.f. of hydrogen per barrel of feedstock, for a period of 960 hours. At the end of the pretreatment period the indicated amount of carbon had deposited on the catalyst.

The coked catalyst portion so produced, and an additional portion of a similar catalyst that had not been coked, by such a pretreatment or otherwise, then were used separately to continuously catalytically dewax separate portions of a hydrocarbon stock of the following description:

Mixture of hydrocarbons containing the following proportions of the indicated components

| Component: | Weight percent |
|---|---|
| $nC_{24}$ | 26 |
| $nC_{28}$ | 24 |
| $iC_{30}$ (squalane) | 25 |

The catalytic dewaxing conditions and ratios of isoparaffins to normal paraffins in the feed and in the products for the separate catalytic dewaxing operations with the coked and uncoked catalyst portions were as follows:

| | | Hydrocarbon product, from dewaxing feed at— | |
|---|---|---|---|
| Ratio | Hydrocarbon feed | 618° F., 860 p.s.i.g.¹ | 728° F., 865 p.s.i.g.² |
| Squalane/nC₂₄ | 0.96 | 0.90 | ³ 4.1 |
| Squalane/nC₂₈ | 1.04 | 1.17 | ³ 8.7 |

¹ 1.0 LHSV, with uncoked catalyst.
² 0.83 LHSV, with coked catalyst.
³ The product from dewaxing with the coked catalyst has much higher ratios of branched paraffins/normal paraffins than the product from dewaxing with the uncoked catalyst.

What is claimed is:

1. A hydrocarbon conversion catalyst comprising mordenite, at least one hydrogenating component, and carbon in an amount of at least one-half weight percent based on the total catalyst.

2. A catalyst as in claim 1, wherein said mordenite is in the hydrogen form.

3. A catalyst as in claim 1, wherein said hydrogenating component is selected from the metals platinum, palladium, iridium, ruthenium, rhodium and nickel and compounds of said metals.

4. A catalyst as in claim 1, wherein said hydrogenating component is selected from platinum and compounds of platinum and palladium and compounds of palladium, and wherein said catalyst further comprises a component selected from rhenium and compounds of rhenium.

5. A catalyst as in claim 1, which contains 1 to 5 weight percent carbon.

6. The method of improving the catalytic dewaxing properties of a catalyst comprising mordenite and at least one hydrogenating component, which comprises contacting said catalyst with hydrogen and a heavy hydrocarbon distillate boiling in the range 500° to 1100° F., at a temperature in the range 400° to 900° F., a pressure in the range 500 to 3500 p.s.i.g., and a liquid hourly space velocity in the range 0.1 to 10, at a total hydrogen rate in the range 200 to 20,000 s.c.f. of hydrogen per barrel of said distillate, until said catalyst contains at least one-half weight percent carbon, based on the total catalyst.

7. A catalytic dewaxing process which comprises contacting in a reaction zone a hydrocarbon feedstock containing normal paraffins with hydrogen and a catalyst comprising mordenite in hydrogen form, at least one hydrogenating component, and carbon in an amount of at least one-half weight percent based on the total catalyst, at a temperature of 400° to 900° F., a pressure of 100 to 2000 p.s.i.g., a liquid hourly space velocity of 0.2 to 25 volumes of said feedstock per volume of catalyst per hour, and a total hydrogen rate of 200 to 20,000 s.c.f. of hydrogen per barrel of said feedstock, and recovering from said reaction zone a liquid product containing in the feed boiling range portion thereof a smaller percentage of normal paraffins than is contained in said feedstock.

8. A process as in claim 7, wherein said mordenite is hydrogen mordenite, and wherein said hydrogenating component is selected from the metals platinum, palladium, iridium, ruthenium, rhodium and nickel and compounds of said metals.

9. A process as in claim 8, wherein said hydrogenating component is selected from platinum and compounds of platinum and palladium and compounds of palladium, and wherein said catalyst further comprises a component selected from rhenium and compounds of rhenium.

10. A process as in claim 7, wherein said temperature is 500° to 850° F., said pressure is 500 to 1500 p.s.i.g., said liquid hourly space velocity is 2 to 10 volumes of said feedstock per volume of catalyst per hour, and said total hydrogen rate is 1000 to 10,000 s.c.f. of hydrogen per barrel of said feedstock.

11. A process as in claim 7, wherein said feedstock contains less than 50 p.p.m. organic nitrogen and less than 100 p.p.m. organic sulfur.

12. A process as in claim 7, wherein said catalyst contains 1 to 5 weight percent carbon.

13. A process as in claim 7, wherein said feedstock boils in the range 400° to 750° F.

14. A process for producing a jet fuel which comprises hydrocracking a hydrocarbon feedstock boiling in the range 500° to 1000° F. by contacting said feedstock in a reaction zone with hydrogen and a hydrocracking catalyst at hydrocracking conditions, withdrawing from said reaction zone a first fraction boiling in the range 300° to 650° F. and a second fraction boiling in the range 400° to 750° F. and having a higher freeze point than said first fraction, catalytically dewaxing said second fraction in the presence of hydrogen and a catalyst comprising mordenite in hydrogen form, at least one hydrogenating component, and carbon in an amount of at least one-half weight percent, based on the total catalyst, to produce a dewaxed product, and combining said first fraction with at least a portion of said dewaxed product boiling in the range 300° to 650° F. to produce a high-quality jet fuel.

References Cited

UNITED STATES PATENTS

| | | | |
|---|---|---|---|
| 3,509,040 | 4/1970 | McKinney et al. | 208—59 |
| 3,507,931 | 4/1970 | Morris et al. | 260—683.65 |
| 3,492,218 | 1/1970 | Collier et al. | 208—27 |
| 3,446,865 | 5/1969 | Roth et al. | 260—669 |
| 2,999,805 | 9/1961 | Myers | 208—140 |
| 3,424,671 | 1/1969 | Kay | 208—111 |
| 3,427,243 | 2/1969 | Hass et al. | 208—111 |
| 3,516,925 | 6/1970 | Lawrance et al. | 208—111 |
| 3,539,495 | 11/1970 | Egan | 208—111 |
| 3,539,498 | 11/1970 | Morris et al. | 208—111 |
| 3,433,851 | 3/1969 | Keblys | 260—683.3 |
| 3,507,779 | 4/1970 | Baillie et al. | 208—120 |

FOREIGN PATENTS

| | | | |
|---|---|---|---|
| 1,088,933 | 10/1967 | Great Britain | 208—DIG. 2 |

DELBERT E. GANTZ, Primary Examiner

G. E. SCHMITKONS, Assistant Examiner

U.S. Cl. X.R.

208—59, 60, 78; 252—446, 455 Z